US006701871B1

(12) United States Patent
Johnson

(10) Patent No.: US 6,701,871 B1
(45) Date of Patent: Mar. 9, 2004

(54) PET CARRIER

(76) Inventor: Joanna L. Johnson, P.O. Box 13302, Des Moines, IA (US) 50310

( * ) Notice: Subject to any disclaimer, the term of this patent is extended or adjusted under 35 U.S.C. 154(b) by 160 days.

(21) Appl. No.: 09/992,794

(22) Filed: Nov. 13, 2001

(51) Int. Cl.$^7$ .............................................. A01K 29/00
(52) U.S. Cl. ..................... 119/497; 119/500; 119/453
(58) Field of Search ........................ 119/497, 482–496, 119/500, 453, 484, 452

(56) References Cited

U.S. PATENT DOCUMENTS

| | | | | |
|---|---|---|---|---|
| 1,158,968 A | * | 11/1915 | Benedict | 119/433 |
| 2,522,391 A | * | 9/1950 | McGonigle | 119/453 |
| 2,620,588 A | * | 12/1952 | Critser | 43/55 |
| 3,284,273 A | * | 11/1966 | Prentice | 119/169 |
| 3,834,352 A | * | 9/1974 | Gervis | 119/453 |
| 3,850,144 A | * | 11/1974 | Springer et al. | 108/38 |
| 4,420,103 A | | 12/1983 | Douglass | |
| 4,648,121 A | | 3/1987 | Lowe | |
| 4,785,766 A | * | 11/1988 | Blalock, Jr. | 119/453 |
| 4,977,857 A | | 12/1990 | Slawinski | |
| 5,044,321 A | | 9/1991 | Selph | |
| 5,148,956 A | | 9/1992 | Funk | |
| 5,170,745 A | * | 12/1992 | Burdette, Jr. | 119/497 |
| 5,176,102 A | | 1/1993 | Tracy | |
| 5,193,486 A | | 3/1993 | Kitchens | |
| 5,220,884 A | * | 6/1993 | Townsend | 119/28.5 |
| 5,230,304 A | | 7/1993 | Santoro | |
| RE34,517 E | * | 1/1994 | White | |
| 5,277,148 A | | 1/1994 | Rossignol et al. | |
| 5,419,281 A | | 5/1995 | Williams et al. | |
| 5,445,302 A | * | 8/1995 | Holtorf | 119/497 |
| 5,715,772 A | * | 2/1998 | Kamrath et al. | 119/169 |
| 5,761,992 A | * | 6/1998 | Gallo | 119/497 |
| 5,901,664 A | * | 5/1999 | McKernan | 119/453 |
| 6,021,740 A | | 2/2000 | Martz | |
| D424,248 S | * | 5/2000 | Sommers | D30/109 |
| 6,070,555 A | * | 6/2000 | Stubbs | 119/712 |
| 6,092,488 A | * | 7/2000 | Allawas | 119/474 |
| 6,155,206 A | * | 12/2000 | Godshaw | 119/453 |
| D436,723 S | * | 1/2001 | Ankri | D3/218 |
| 6,286,461 B1 | * | 9/2001 | Martz | 119/497 |
| 6,308,661 B2 | * | 10/2001 | Burns et al. | 119/497 |
| D453,593 S | * | 2/2002 | Licciardello | D30/109 |
| D455,009 S | * | 4/2002 | Thayer | D3/316 |
| 6,374,775 B1 | * | 4/2002 | Baumsteiger | 119/496 |

* cited by examiner

Primary Examiner—Yvonne Abbott
(74) Attorney, Agent, or Firm—Brett Trout

(57) ABSTRACT

An animal transport system is provided, having a wall defining an interior space and a top opening. At least a portion of the wall is constructed so as to restrict the passage of claws there through. The system also comprises a protective covering and means for releasably securing the cover over the interior space. Carrying means are provided, as are means for allowing the transfer of air into and out of the interior space. Preferably, the system is of a construction which biases an animal provided therein away from a prone position, protects the animal from environmental conditions, and obstructs the animal's view of the exterior, to calm the animal and reduce any increase in anxiety as the animal is moved from a dangerous area to a safe area.

20 Claims, 3 Drawing Sheets

PET CARRIER

BACKGROUND OF THE INVENTION

1. Field of the Invention

This invention relates to a carrier for transporting animals and, more specifically, to an emergency hands-free transport system for moving animals away from a dangerous area.

2. Description of the Prior Art

American households contain millions of pets, the majority of which are cats and dogs. Throughout the course of a lifetime, most households encounter some type of emergency situation, such as a tornado, flood, hurricane, earthquake, act of war, etc. While removing children from such situations may be difficult, removing pets, armed with teeth and claws, can be extremely difficult.

Prior art pet carriers often include a handle which engages the carrier's hand. Unfortunately, this prevents the hand from being used to carry children or other valuable items away from the dangerous situation. Having one hand occupied also limits the user's ability to react to environmental conditions. Soft-bodied carrier bags, such as that disclosed in U.S. Pat. No. 4,977,857, disclose the use of a wheeled base. However, in emergency situations which involve stair climbing or rough terrain, a wheel base system is often not feasible and adds additional weight to the entire system.

It is also known in the art to provide an animal carrier with shoulder straps to free a user's hand when transporting an animal. U.S. Pat. Nos. 5,277,148; 5,419,281 and 5,148,956 both disclose such carriers. However, drawbacks associated with such prior art devices include the difficulty involved in inserting an anxious animal into such a carrier and the potential exposure of an animal's claws and teeth through the carrier. Furthermore, these prior art devices are designed for utilization in recreation or animal husbandry situations where the animal is calm and unlikely to attack. In a dangerous situation, animals are often agitated and time is of the essence. In such situations, inserting an animal into such prior art devices would be difficult, and would expose the user to the animal's teeth and claws. Such devices have the additional drawback in an emergency situation of providing little protection from smoke, fire, flying debris, hail or other environmental and external attack. Many prior art devices also carry animals, especially cats, in an uncomfortable manner. Such carriers can be cruel and even dangerous if a cat were to become agitated or frightened.

Another drawback associated with such prior art devices is that such devices are designed to allow the animal wide view of the surroundings. In an emergency situation, where such surroundings could be dangerous and prone to agitate the animal, it would be desirable to provide an enclosure which restricted an animal's view of its surroundings. Yet another drawback of the prior art devices is the potential harm that would be inflicted to an animal if a user attempted to put an animal into such a device in an agitated state. Although speed is of the essence in an emergency situation, safety of the animal, both during insertion and transport, are of critical concern.

Accordingly, it would be desirable to provide an emergency animal transport system which allowed for the safe insertion and transport of an agitated animal, while freeing a user's hands. The difficulties encountered in the prior art noted hereinabove are substantially eliminated by the present invention.

SUMMARY OF THE INVENTION

In an advantage provided by this invention, an emergency animal transport system is provided which provides for the safe transport of an animal from an emergency situation.

Advantageously, this invention provides a lightweight animal transport system which frees up a user's hands during an emergency situation.

Advantageously, this invention provides an animal transport system which distributes an animal's weight over a user for ease of transport.

Advantageously, this invention provides an animal transport system which shields a user from an animal's claws and teeth during transport.

Advantageously, this invention provides an animal transport system which shields an animal from agitating external activity while the animal is transported from a dangerous situation.

Advantageously, this invention provides an animal transport system which protects an animal from smoke, fire, hail and other debris during transport away from a dangerous situation.

Advantageously, this invention provides an animal transport system comprising a wall, defining an interior space and a top opening. At least a portion of the wall is constructed so as to restrict the passage of claws therethrough. A protective cover is provided for releasable securement over the interior space. Means are provided for carrying the wall and for allowing the transfer of fluid into the interior space.

In the preferred embodiment, the wall and protective cover are constructed of semi-rigid material and the cover is constructed for releasable mating engagement over the top opening defined by the wall. The wall is constructed so as to bias an animal placed within the interior space away from a prone position.

BRIEF DESCRIPTION OF THE DRAWINGS

The present invention will now be described, by way of example, with references to the accompanying drawings in which.

DETAILED DESCRIPTION OF THE PREFERRED EMBODIMENT

Figure 1:
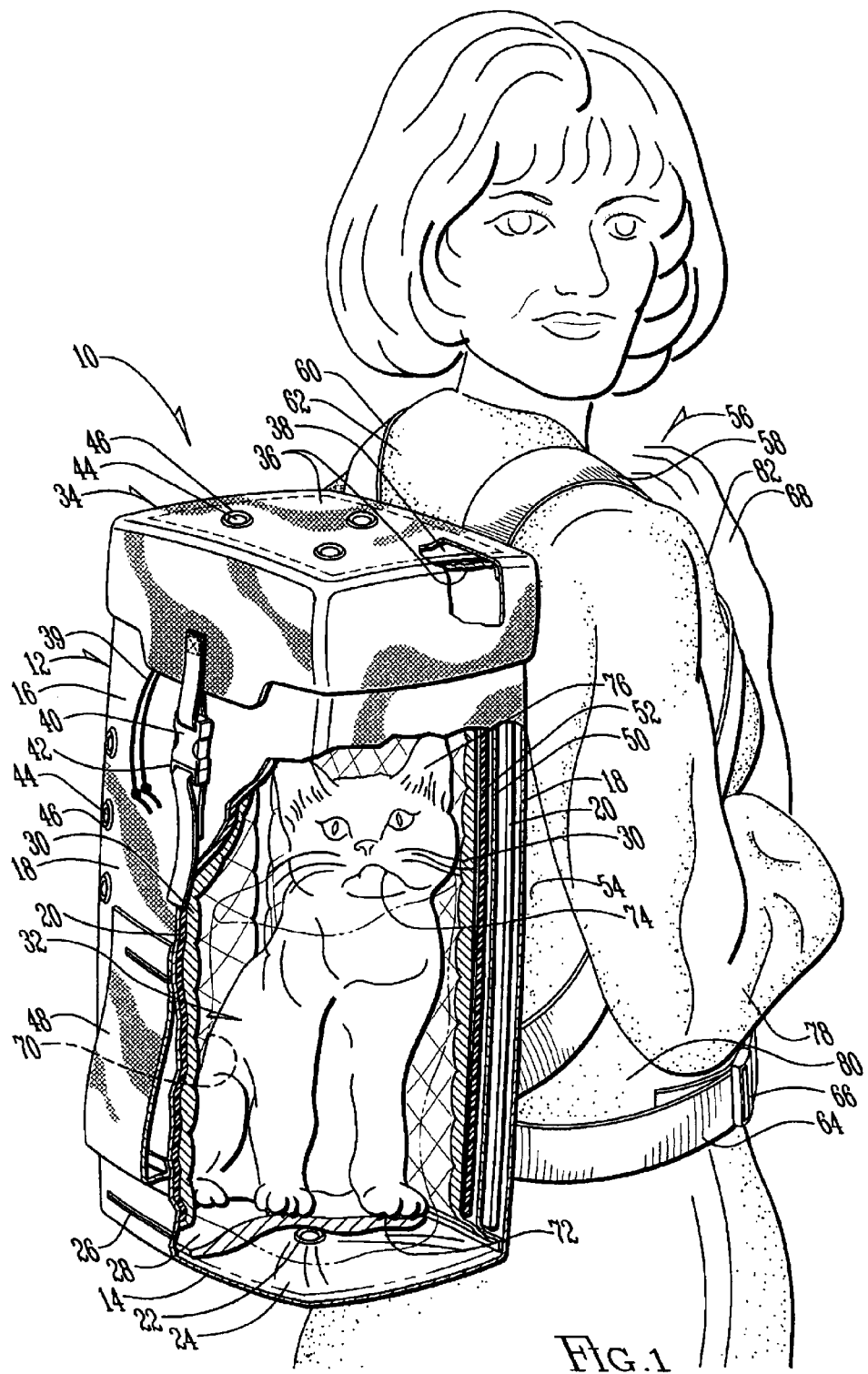
FIG. 1 illustrates a side view of the animal transport system of the present invention, shown being worn by a user and showing the carrier in cross-section and partial phantom.

With reference to the drawings, an improved animal transport system is shown generally as (10) in FIG. 1. The animal transport system comprises a lower enclosure (12), having a bottom (14) and a sidewall (16). The sidewall (16) is preferably constructed of a pair of flexible sheets (18), which may be nylon or any other suitable material. Sandwiched between the sheets (18) is a stiffener material (20), such as acrylic-polyvinyl chloride. Of course, any suitable flexible or stiffener material may be used. The bottom (14) is preferably constructed of a semi-rigid material, such as acrylic-polyvinyl chloride, and is preferably secured to the sidewall (16) by sewing or glue.

Figure 2:
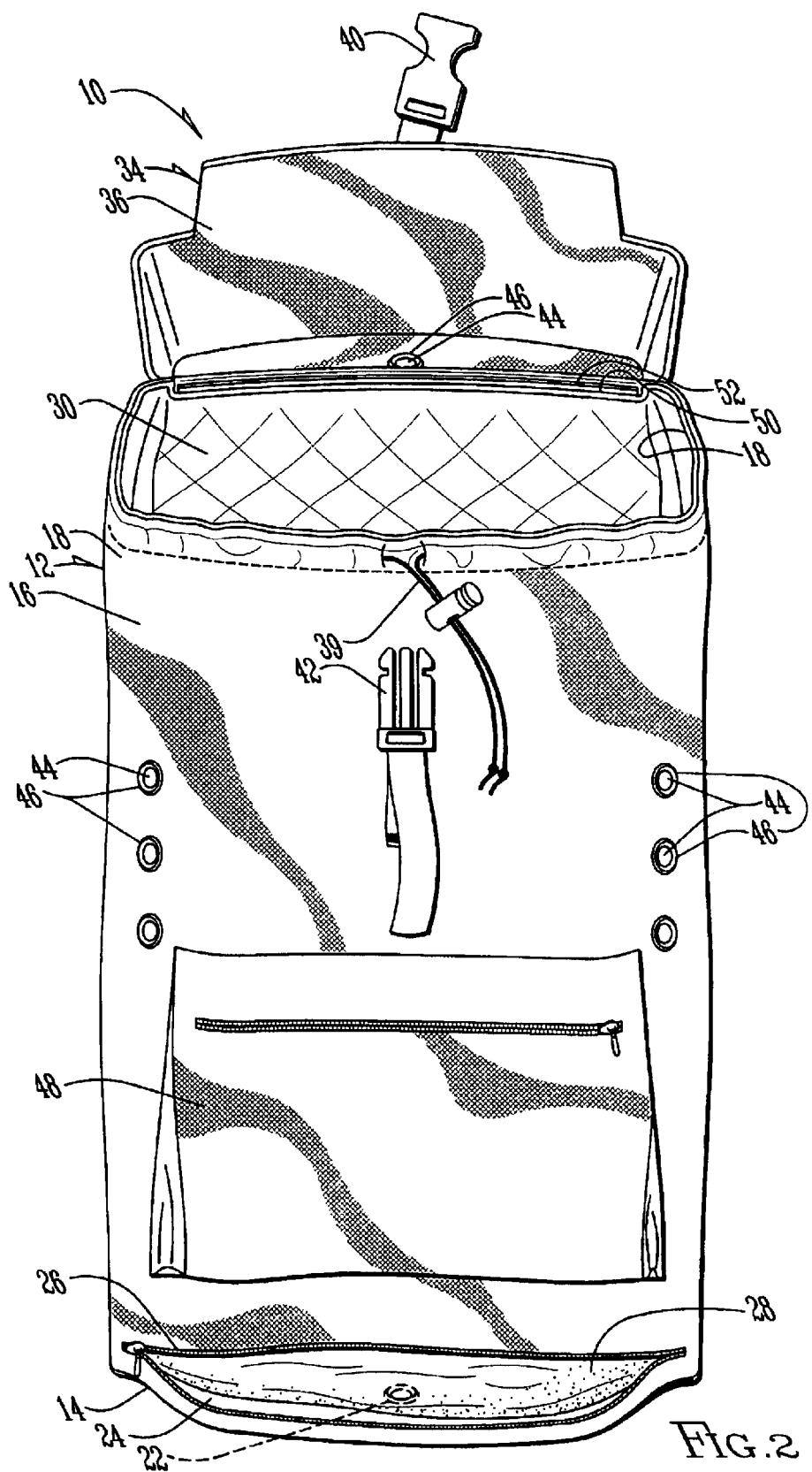
FIG. 2 illustrates a rear plan view of the pet carrier of FIG. 1, shown with the lid and pouch open.

As shown in FIG. 1, the bottom (14) is preferably sloped downward and inward, toward a hole (22) which serves as a drain. Provided below the bottom (14) is a flexible pouch (24), preferably constructed integral with the sidewall (16) and provided with a zipper (26). As shown in FIG. 2, when the zipper (26) is opened, the pouch (24) opens to reveal a reservoir pad (28) which may be secured within the pouch (24). The reservoir pad (28) may be of any suitable construction, such as reusable, washable wool or cotton. Alternatively, the pad (28) may be of a disposable cotton construction, such as that used to manufacture disposable diapers. As shown in FIG. 1, when the zipper (26) is closed, the reservoir pad (28) is maintained between the bottom (14) and pouch (24) to catch urine and small or soft fecal matter passing through the hole (22) of the bottom (14). Alternatively, the bottom (14) may be constructed as a screen to allow the passage of material thereacross, without the need for any slope. When the reservoir pad (28) becomes soiled, the zipper (26) is actuated to open the pouch (24) to allow removal and washing and/or replacement of the reservoir pad (28).

As shown in FIGS. 1 and 2, sewn along the interior of the sidewall (16) is a quilted cotton layer (30). Although the layer (30) may be constructed of any suitable materials or dimensions, the layer (30) is preferably constructed to be puffy and resilient enough to securely restrain an animal (32) provided within the lower enclosure (12), without crushing or suffocating the animal.

Also as shown in FIGS. 1 and 2, hingeably coupled to the lower enclosure (12) is a protective cover (34). Like the sidewall (16), the protective cover (34) is preferably constructed of a sandwich of flexible nylon sheets (36) surrounding an inner stiffener material (38), to provide the protective cover (34) with resiliency and form, without adding excess weight. As shown in FIG. 2, the protective cover (34) is preferably constructed so as to fit snugly over the lower enclosure (12). The protective cover (34) preferably extends down over the lower enclosure (12), sufficiently to prevent egress of the animal (32) between the lower enclosure (12) and the protective cover (34). The lower enclosure (12) is preferably fitted with a drawstring (39) to narrow and taper the top of the lower enclosure (12), to aid in the securement of the protective cover (34) over the lower enclosure (12). The overlap between the protective cover (34) and sidewall (16) and lower enclosure (12), when the protective cover (34) is closed, is preferably between one and thirty centimeters, more preferably between five centimeters and twenty centimeters, and most preferably about ten centimeters.

Figure 3:
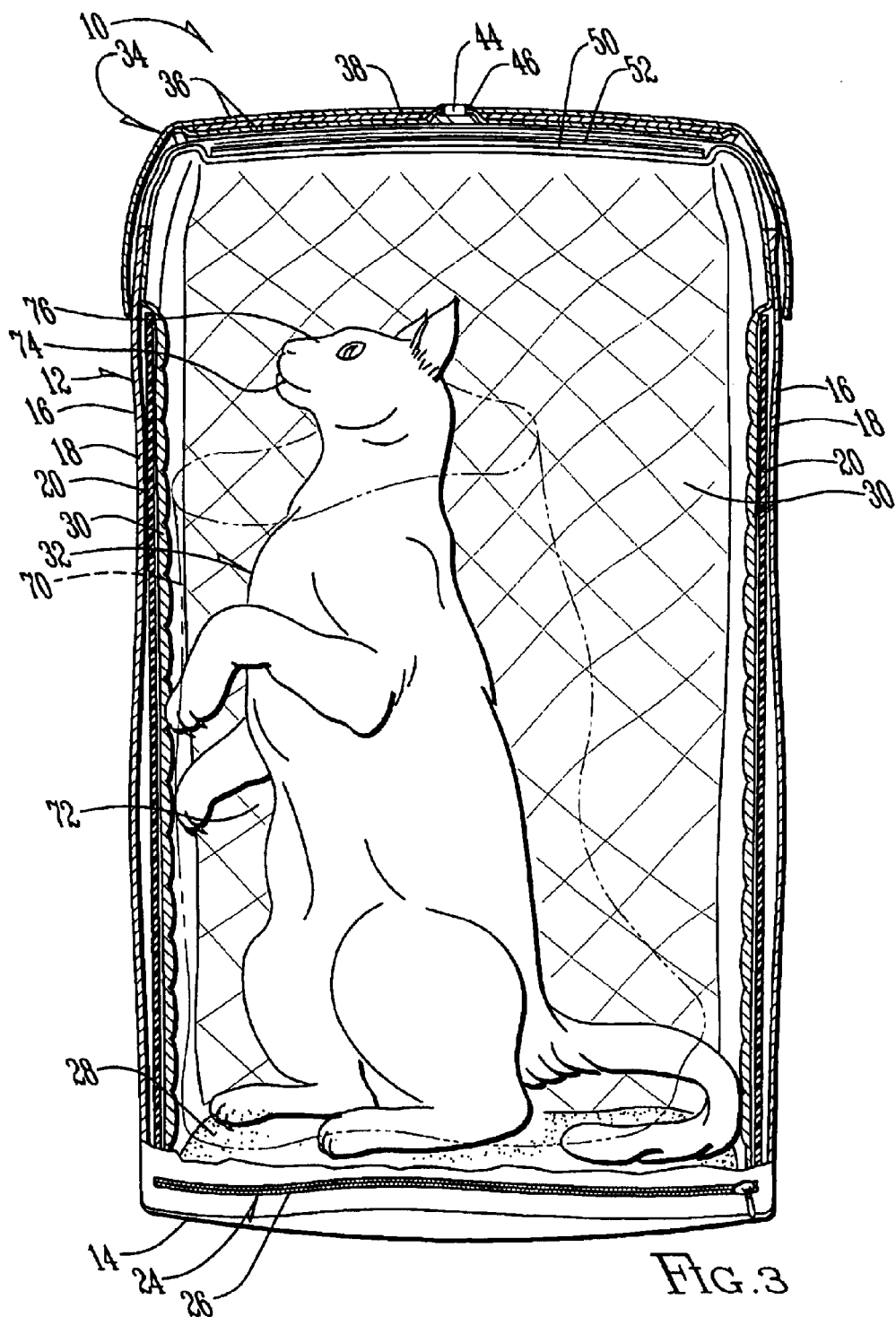
FIG. 3 illustrates a rear plan view of the pet carrier of FIG. 1, shown in partial cutaway with an animal contained therein, and the cover releasably secured to the sidewall.

Once the protective cover (34) has been pivoted over the lower enclosure (12), a resilient female clasp section (40) is brought into mated engagement with a male clasp (42), secured to the sidewall (16) of the lower enclosure (12). Although any suitable clasps (40) and (42) may be used, in the preferred embodiment the clasps (40) and (42) are of a heavy plastic construction, and are operable with one hand, to securely maintain the protective cover (34) in engagement with the lower enclosure (12) until released. As shown in FIG. 3, the protective cover (34) extends down to an overlap of about fifteen centimeters at the point where the clasps (40) and (42) meet. The clasps (40) and (42) are preferably sewn to the protective cover (34) and sidewall (16) respectively, using a sufficient assembly to prevent the inadvertent disengagement of the clasps (40) and (42) from themselves, or from the protective cover (34) or sidewall (16). As shown in FIG. 2, the sidewall (16) is provided with a plurality of vents (44), which preferably are each surrounded with a metal grommet (46). The grommets (46) still allow ingress and egress of a fluid, such as air, within the lower enclosure (12), but prevent an animal (32) contained within the lower enclosure (12) from maintaining purchase on the vent and tearing the sidewall (16). As shown in FIG. 2, the sidewall (16) may also be provided with an outer pocket (48) for emergency supplies or other material.

As shown in FIG. 1, the lower enclosure (12) is provided on its interior, between the quilted cotton layer (30) and the sidewall (16) with a pocket (50), within which is provided a rubber pad (52). The rubber pad (52) is preferably of a thickness greater than one millimeter and less than two centimeters. The rubber pad (52) is preferably of construction dense enough to resist penetration by an animal claw or tooth. Although a rubber pad (52) is used in the preferred embodiment, any plastic, metal, or any other suitable material, may be substituted to resist penetration of a tooth or claw through the lower enclosure (12) to the back (54) of a user (56). The pocket (50) is preferably of a depth and width sufficient to accommodate a rubber pad (52) sized to completely protect the back (54) of the user (56).

As shown in FIG. 1, sewn onto the sidewall (16) are a first shoulder strap (58) and a second shoulder strap (60). The shoulder straps (58) and (60) may be of any suitable construction known in the art, but are preferably constructed of heavy duty nylon or similar resilient material. The straps (58) and (60) are of a construction sufficient to extend over the shoulders (62) of a user, and support the animal transport system (10) as it is being carried. The system (10) is also preferably provided with a waist belt (64), provided with a quick-release buckle (66), such as those well known in the art to allow actuation with one hand (68).

When it is desired to operate the system (10) of the present invention, the animal (32), such as a cat, is provided along with an animal transport system (10). The system (10) is preferably designed small enough to maintain the animal (32) within the lower enclosure (12), in a non-prone position, but large enough to avoid suffocating or injuring the animal (32). As shown in FIGS. 1 and 2, the animal transport system (10) is preferably taller and wider than it is deep. This construction is designed to provide the animal with sufficient room to breathe, and move laterally, while biasing the animal (32) away from a prone position, and maintaining weight close to the user's back (54). It is desirable to maintain the animal (32) away from a prone position to aid in calming the animal (32) and avoiding an increase in anxiety.

In an emergency situation, an air permeable flexible sheet, such as a blanket (70), well known in the art for transporting animals (32), is provided and wrapped around the animal (32) a sufficient number of times and in a sufficient manner to limit the animal's use of its claws (72) and teeth (74). Although the head (76) of the animal (32) may be wrapped within the blanket (70), in the preferred embodiment, the animal (32) is wrapped in the blanket (70) with the head (76) exposed, to allow the animal (32) to obtain additional oxygen. Once the animal (32) has been wrapped in the blanket (70), the animal (32) is lifted and inserted into the lower enclosure (12). Once the animal (32) has been inserted into the lower enclosure (12), the protective cover (34) is pivoted upward and over the lower enclosure (12), and the clasps (40) and (42) are id coupled to one another to secure the animal (32) within the animal transport system (10). As shown in FIG. 3, the protective cover (34) fits snugly enough over the lower enclosure (12) to substantially prevent the ingress of smoke, rain, and debris into the interior (12).

Once the animal (32) has been thereby secured, the user (56) lifts the animal transport system (10), extending the user's arms (78) through the shoulder straps (58) and (60), and secures the waist belt (64) around the user's waist (80). The user (56) may thereby transport the animal (32) within the animal transport system (10) away from the disaster location to a safe area. After the animal (32) has been transported, or during transportation, the pouch (24) may be opened with the zipper (26) and the reservoir pad (28) may be cleaned or replaced as it becomes soiled, without disturbing the animal (32). After replacement, the zipper (26) is used to again secure the reservoir pad (28) within the pouch (24) and is ready for reuse. If it is desired to transport the animal (32) in a vehicle (not shown), the animal transport system (10) may be placed in a vehicle seat (not shown), and the shoulder straps (58) and waist belt (64) secured around the seat.

The foregoing description and drawings merely explain and illustrate the invention, and the invention is not limited thereto, except insofar as the claims are so limited, as those skilled in the art who have the disclosure before them will be able to make modifications and variations therein without departing from the scope of the invention. For example, it is anticipated that any desired type of handle assembly or strap may be utilized in association with the animal transport system (10). Additionally, the animal transport system (10) may be secured to a bungee line or parachute to allow the animal (32) faster egress from a dangerous situation. It is also anticipated that the animal transport system (10) may be affixed with a wheel to depend the animal transport system (10) from a track or cord to allow the animal transport system (10) to move an animal (32) therein quickly away from a disaster area toward a safe area. It is further anticipated that the animal transport system (10) instead may be secured against the user's chest (82). It is further anticipated that the animal transport system (10) may be utilized for a plurality of animals (32) by separating the lower enclosure (12) into compartments, using materials such as that used to construct the sidewall (16), or by removing the rubber pad (52) and positioning it so as to divide the lower enclosure (12). The system (10) may also be utilized without compartments by providing several animals (32) within the lower enclosure (12). It is also anticipated that the animal transport system (10) may be provided with wheels, rollers or casters, and/or an extensible handle to allow the animal transport system to be pulled along the ground, either during transport or once the animal (32) has been moved to a safe location. It is anticipated that the transport system may be provided with a removable interior bag to aid in cleaning and maintenance.

What is claimed is:

1. An animal transport system comprising:
   (a) a wall defining an interior;
   (b) wherein said wall has a height;
   (c) wherein said wall defines an opening having a width;
   (d) wherein said height is greater than said width;
   (e) a bottom secured to said wall;
   (f) a protective cover;
   (g) means for releasably securing said cover over said interior space;
   h) wherein said wall does not provide for a lateral animal egress opening of a size greater than one-half said height; and
   (i) means for securing said wall on a user which maintains said wall in a substantially upright orientation during transport.

2. The animal transport system of claim 1, wherein said wall is constructed so as to substantially restrict the exterior view of an animal positioned within said interior space.

3. The animal transport system of claim 1, further comprising a flexible sheet removably positioned within said interior space.

4. The animal transport system of claim 3, wherein said flexible sheet is positioned substantially between said wall and the animal.

5. The animal transport system of claim 1, wherein said carrying means comprises a shoulder strap.

6. The animal transport system of claim 5, further comprising a waist belt coupled to said wall.

7. The animal transport system of claim 1, wherein said wall comprises a substantially flat platform coupled to a sidewall extending upward therefrom.

8. The animal transport system of claim 1, wherein said wall is of a substantially rigid construction and wherein said cover is of a substantially rigid construction.

9. The animal transport system of claim 8, wherein said cover is constructed for mating engagement over said wall.

10. The animal transport system of claim 1, further comprising a removable fluid absorbent pad in fluid communication with said interior space.

11. The animal transport system of claim 10, further comprising means positioned over said pad for providing a landing surface for an animal, wherein said providing means separates an animal from fluid, while allowing fluid to pass thereacross to said pad.

12. An animal transport system comprising:
   a. a housing comprising:
      i. a platform;
      ii. a sidewall coupled to said platform and defining an interior space;
      iii. a protective cover; and
      iv. means coupled to said cover for releasably securing said cover over said interior space;
   b. means for allowing the passage of fluid across said housing;
   c. wherein said housing is of a construction which bias an animal placed within said interior space away from a prone position; and
   d. means coupled to said housing for carrying said housing.

13. The animal transport system of claim 12, wherein said releasably securing means is means for securing said cover over said sidewall sufficiently to prevent the ingress of debris into said interior space.

14. The animal transport system of claim 12, further comprising means coupled to at least a portion of said housing for restricting the passage of claws therethrough.

15. The animal transport system of claim 12, further comprising a flexible sheet removably positioned within said interior space.

16. The animal transport system of claim 12, further comprising a removable fluid absorbent pad in fluid communication with said interior space.

17. A method for transporting an animal comprising:
   a. providing an animal transport system comprising:
      i. a wall defining an interior space and a top opening wherein at least a portion of said wall is constructed so as to restrict the passage of claws there through;
      ii. a protective cover;
      iii. means for releasably securing said cover over said interior space;
      iv. means for carrying said wall; and
      v. means provided for allowing the transfer of fluid into said interior;

b. securing the animal within said interior space;

c. releasably securing said cover over said top opening;

d. securing said system to a person; and e. transporting said system.

18. The method for transporting an animal of claim 17, further comprising wrapping the animal in a flexible sheet and inserting the animal and flexible sheet into said interior space through said top opening.

19. The method for transporting an animal of claim 17, further comprising positioning a removable fluid absorbent pad in fluid communication with said interior space.

20. The method for transporting an animal of claim 17, further comprising providing a landing surface for the animal which allows the passage of fluid thereacross to a pad.

* * * * *